United States Patent
Newton

(10) Patent No.: US 6,349,537 B1
(45) Date of Patent: Feb. 26, 2002

(54) VEHICLE MAIN AND AUXILIARY POWER UNITS

(75) Inventor: Arnold C Newton, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/685,555

(22) Filed: Oct. 11, 2000

(30) Foreign Application Priority Data

Oct. 19, 1999 (GB) ................................. 9924545

(51) Int. Cl.[7] ................................................ F02L 7/00
(52) U.S. Cl. .............................................. 60/39.07
(58) Field of Search ...................................... 60/39.07

(56) References Cited

U.S. PATENT DOCUMENTS 5,482,791 A    1/1996   Shingai
6,230,496 B1 * 5/2001   Hofmann et al. ............. 60/706

FOREIGN PATENT DOCUMENTS

| GB | 1 447 835 SP | 9/1976 |
| JP | 3148332 | 6/1991 |
| JP | 040342961 A | 11/1992 |

* cited by examiner

Primary Examiner—Timothy S. Thorpe
Assistant Examiner—Ehud Gartenberg
(74) Attorney, Agent, or Firm—W. Warren Taltavull; Manelli Denison & Selter PLLC

(57) ABSTRACT

An aircraft gas turbine propulsion engine includes a compressor (10) and ancillary systems (cabin pressurizing pumps and other service) in a box 16. A fuel cell 18 powers electric motors (12) and (14) via a switch (20) for the purpose of either simultaneously driving the compressor (10) and ancillary systems, or the ancillary systems alone.

5 Claims, 1 Drawing Sheet

VEHICLE MAIN AND AUXILIARY POWER UNITS

FIELD OF THE INVENTION

The present invention relates to power units of the kind which on the one hand, propel an associated vehicle, be it on land, sea, or through the air, and on the other hand, provide essential services such as electrical power for lighting, and where the vehicle is an aircraft, a pressurised air atmosphere.

BACKGROUND OF THE INVENTION

Where the main power unit is a gas turbine propulsion engine, and is installed in an aircraft, it is known to also install an auxiliary gas turbine engine therein, of much smaller proportion than the main engine. The smaller engine is connected with a compressor shaft of the larger engine via an electric motor and on start up of the smaller engine, the electric motor in turn rotates the compressor shaft and thus initiates the starting procedure of the main engine. Furthermore, until such time as the main engine is running, the smaller auxiliary engine also powers other ancillary equipment such as is mentioned hereinbefore. However, when the main engine is running, it takes over from the smaller auxiliary engine, which is then switched off.

The arrangement described hereinbefore has a number of drawbacks, eg the smaller engine also needs an air intake and an exhaust flow outlet, which structures have to be engineered into the aircraft structures, thus creating weight and using space. Furthermore, liquid fuel is used, which either reduces the amount available to the main engine, or necessitates a further supply for the smaller engine, which again adds weight and uses space. Yet a further drawback is created by use of the main engine to drive the ancillary equipment during flight of the associated aircraft, because the power which is diverted from the propulsive effort in order to drive those ancillaries, reduces the efficiency of the engine with regard to its primary task of propelling the associated aircraft through the air.

Gas turbine units are being considered which would be capable of continuous running, so as to enable obviation of use of the propulsion engine to operate the ancillary units. However, they would not obviate most of the drawbacks described hereinbefore.

SUMMARY OF THE INVENTION

The present invention seeks to provide an improved dual power system for the propulsion of a vehicle, and the associated ancillary units thereof.

According to the present invention, a vehicle dual power system comprises a gas turbine propulsion engine and ancillary units, an electro chemical fuel cell connected to each via electric motor means, said connection comprising switch means selectively operable such that said electro chemical fuel cell is connected to said electric motor means, to simultaneously cause rotation of a compressor of said gas turbine propulsion engine so as to initiate start up thereof, and to drive said ancillary units, or drive either said compressor or said ancillary units alone.

BRIEF DESCRIPTION OF THE DRAWINGS

The invention will now be described, by way of example and with reference to the accompanying drawings, in which FIG. 1 diagrammatically depicts a gas turbine propulsion engine compressor and associated ancillary units, in driven connection with a fuel cell, in accordance with the present invention.

DETAILED DESCRIPTION OF THE INVENTION

Figure 1:
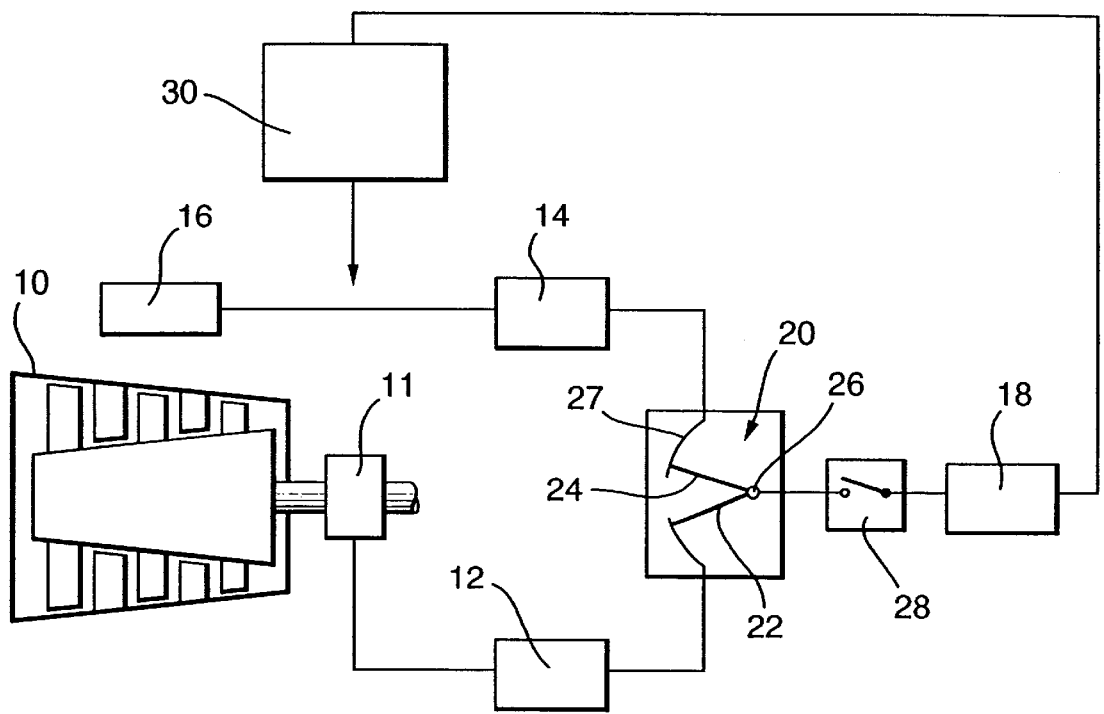

Referring to FIG. 1. A compressor 10 of a gas turbine propulsion engine (not shown) is connected via a gearbox 11, to an electric motor 12, in known manner. Actuation of motor 12 effects rotation of compressor 10, as a first step in initiating start up of the gas turbine propulsion engine (not shown) in known manner.

A second electric motor 14 is connected to a box 16 containing, eg pumps for pressurising the cabin of an aircraft (not shown) powered by the associated gas turbine engine (not shown), of which compressor 10 forms a part.

Electric motors 12 and 14 are connected in parallel to a common fuel cell 18, via a three way switch 20. By 'way' is meant mode of electrical conduction. Switch 20, as shown in the drawing, simultaneously conducts electrical power to both motors 12 and 14, via respective contacts 22 and 24. If however, switch 20 is rotated clockwise, as viewed in the drawing, about a pivot 26, so as to space contact 22 from the wire leading to motor 12, contact 24 still maintains electrical contact with motor 14, via a relatively long, arcuate contact portion 27. Electrical power is thus individually provided, via motor 14, to the pumps in box 16. Anti clockwise rotation of switch 20, about pivot 26, will achieve redirection of the conduction path, to motor 12, so as to achieve rotation of compressor 10.

Fuel cell 18 can be selected from many well know types, provided that its characteristics include a high power to weight ratio, which will not nullify any of the advantages gained by its use.

A by-product, namely $CO_2$, results from the operation of fuel cell 18. The $CO_2$ can be collected, by any suitable means (not shown) and transferred to the gas turbine propulsion engine fuel tank 30, so as to occupy space left by the engine fuel as it is used. By this means, explosive fuel vapours are prevented from forming in the tank. Again, the fuel cell 18 would provide the electrical power to actuate a pump (not shown) with which to effect the transfer.

The man skilled in the art, having read this specification, will appreciate that in practice, the switch 20 will be of a much more refined design, involving electronic circuits, and will know that, as stated hereinbefore, circuits for connecting a fuel cell to apparatus so as to enable electrical driving of that apparatus thereby are known.

The phrase 'ancillary units' is also intended to embrace use of the fuel cell to power electro magnetic bearing, (not shown) where such devices are utilised to support shafts for friction free rotation in a magnetic field, thus obviating the need for lubrication.

Figure 2:
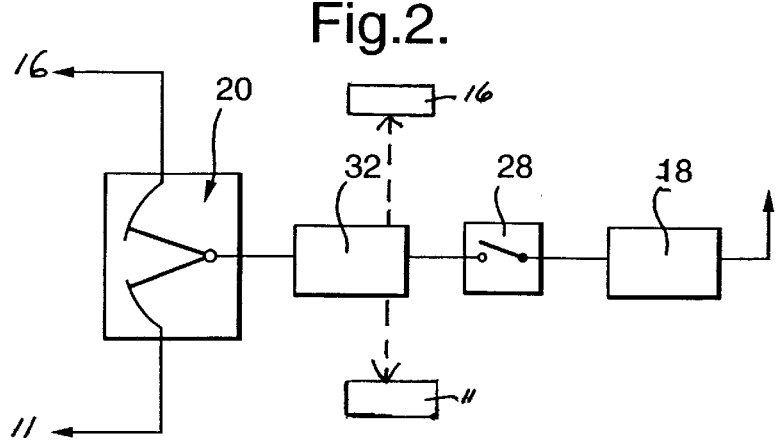
FIG. 2 depicts an alternative arrangement of the circuitry of FIG. 1.

Referring to FIG. 2, in this arrangement, a single motor 32 is substituted for motors 12 and 14 in FIG. 1, and the switch 20 is electrically connected between motor 32 and the compressor 10 and auxiliary power unit 16, while the motor 32 is connected by power shaft to the compressor 10 and unit 16.

The present invention provides a number of advantages when used as a substitute for a gas turbine auxiliary power unit, including those as follows:

a) Power extracted from the main gas turbine propulsion engine is considerably reduced, thus increasing the power available to propel the associated aircraft.

b) Exhaust emissions resulting from the combustion of hydrocarbon fuel are reduced, thus reducing atmospheric pollution.

c) More controllable electrical power input to electro magnetic bearings.
d) Fuel cell generated gases are suitable for transfer to the fuel tanks of the gas turbine propulsion engine, to replace fuel used thereby, and create a non explosive atmosphere.
e) Obviation of gas turbine auxiliary power unit noise.

I claim:

1. A vehicle dual power system comprising: a vehicle mounted gas turbine propulsion engine including a shaft coupled compressor and turbine; a plurality of associated ancillary units; electric motor means arranged to drive the ancillary units and to drive the compressor of the gas turbine propulsion engine in order to initiate start-up thereof; a source of electrical power; switch means; the electric motor means being connected to the source of electrical power via the switch means, the switch means being selectively operable so that the ancillary units and the compressor are driven separately or together by the electric motor means; wherein the source of electrical power is an electrochemical fuel cell.

2. A vehicle dual power system as claimed in claim 1, wherein the electric motor means comprise first and second electric motors, the first electric motor being arranged to drive a compressor of the gas turbine propulsion engine in order to initiate start-up thereof and the second electric motor being arranged to drive the associated ancillary units.

3. A vehicle dual power system as claimed in claim 2, further comprising: a master switch; wherein the master switch is connected between the electro-chemical fuel cell and the switch means, so that the first and second electric motors are electrically isolated from the electrochemical fuel cell until the switch means have been moved to a selected position.

4. A vehicle dual power system as claimed in claim 1, further comprising: a fuel tank associated with the gas turbine propulsion engine; fluid communication means linking the fuel tank with the electro-chemical fuel cell; wherein the gases generated by the electrochemical fuel cell in operation are passed via the fluid communication means into the fuel tank to replace fuel used by the gas turbine propulsion engine and so to provide a non-explosive atmosphere within the fuel tank.

5. A vehicle dual power system as claimed in claim 1, wherein the vehicle is an aircraft.

* * * * *